Figure 3:
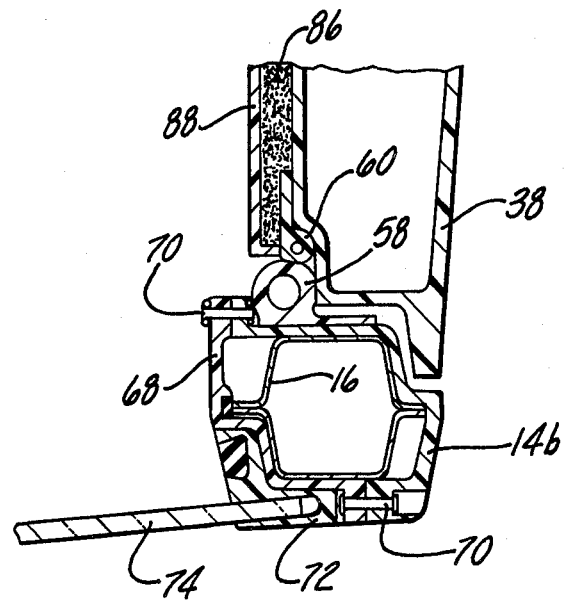

United States Patent [19]

Celli

[11] 4,440,434

[45] Apr. 3, 1984

[54] VEHICLE BODY CONSTRUCTION

[76] Inventor: Aldo Celli, Via Jacopo Palma 9, Milano, Italy, 20146

[21] Appl. No.: 334,234

[22] Filed: Dec. 24, 1981

[51] Int. Cl.³ .............................................. B62D 29/04
[52] U.S. Cl. ........................................ 296/185; 296/187; 296/191; 296/205; 296/208; 296/209; 296/31 P
[58] Field of Search ........ 296/185, 187, 191, 193–197, 296/202, 205, 31 P, 35.1, 37.13, 37.16, 39 R, 39 A

[56] References Cited

U.S. PATENT DOCUMENTS

| | | | |
|---|---|---|---|
| 2,269,451 | 1/1942 | Ford | 296/205 |
| 3,811,721 | 5/1974 | Bolesky | 296/31 P |
| 4,045,075 | 8/1977 | Pulver | 296/205 |
| 4,153,290 | 5/1979 | Barenyi | 296/191 |
| 4,214,788 | 7/1980 | Srock | 296/39 R |
| 4,229,036 | 10/1980 | Toda | 296/202 |
| 4,283,086 | 8/1981 | Morin | 296/31 P |
| 4,355,841 | 10/1982 | Ghidella | 296/31 P |
| 4,355,844 | 10/1982 | Muzzarelli | 296/205 |

FOREIGN PATENT DOCUMENTS

| | | | |
|---|---|---|---|
| 55-4228 | 1/1980 | Japan | 296/202 |
| 36030 | 1/1958 | Poland | 296/205 |
| 526159 | 9/1940 | United Kingdom | 296/205 |

*Primary Examiner*—Randolph Reese
*Assistant Examiner*—Dennis H. Pedder
*Attorney, Agent, or Firm*—Barnes, Kisselle, Raisch, Choate, Whittemore & Hulbert

[57] ABSTRACT

A vehicle body is formed of a plurality of straight structural tubular members welded together to form the vehicle frame and a plurality of plastic panels secured to the structural members to provide the exterior surface of the body. Selected plastic panels have channel-forming projections molded on the inner face thereof which straddle the adjacent structural member. These panels are attached to the structural members by securing plastic adaptors to the inner edges of the channels so that the metal structural frame members are completely enclosed in plastic. The adaptors are secured to the panels by means of self-plugging, blind rivets from the inner side of the body. The interior lining of the vehicle is applied to the inner surfaces of the plastic panels.

6 Claims, 6 Drawing Figures

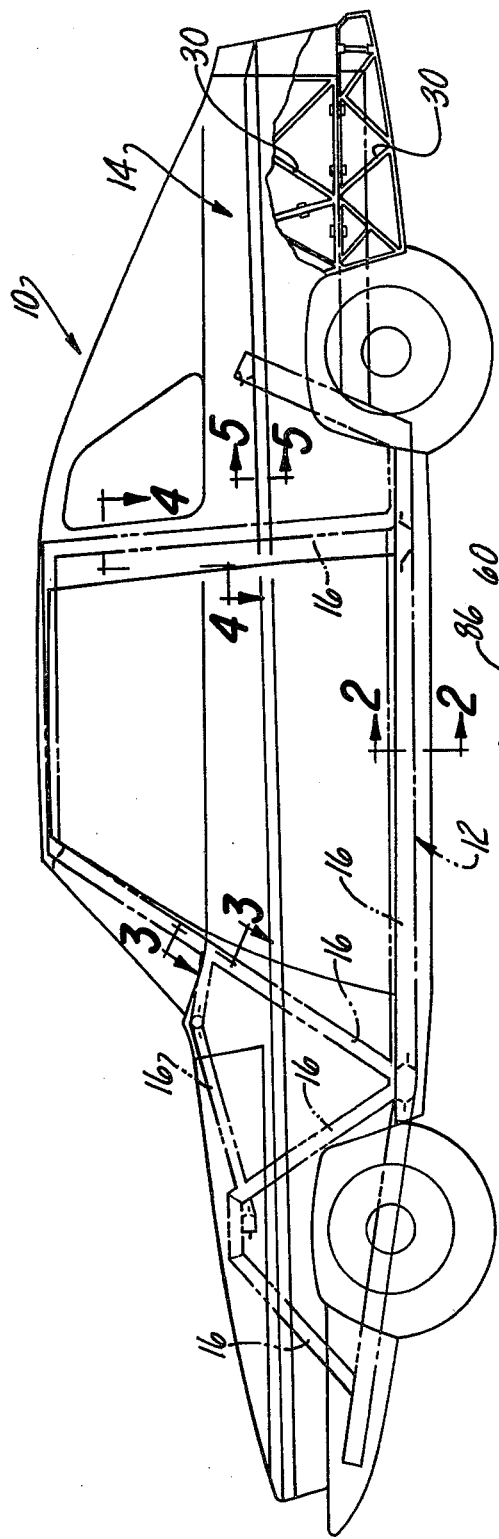
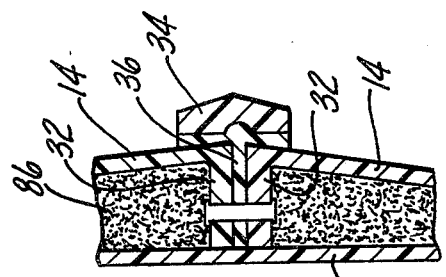
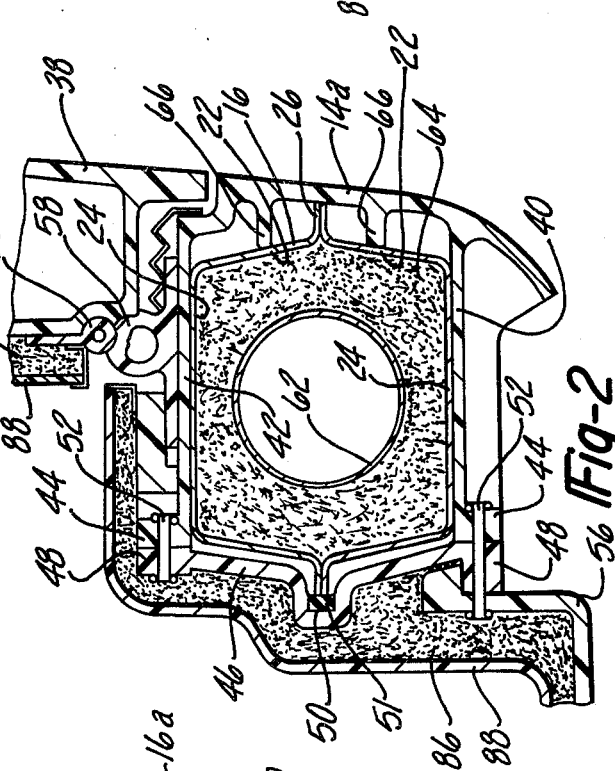
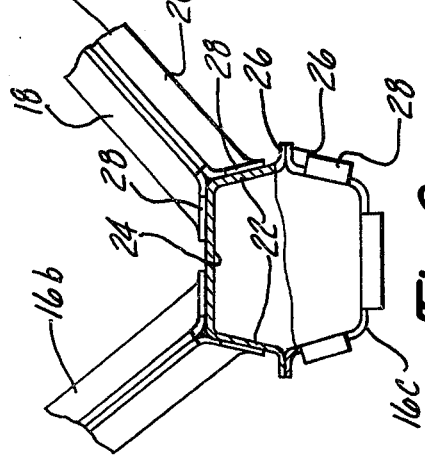

VEHICLE BODY CONSTRUCTION

This invention relates to automotive vehicle bodies.

In the manufacture of automotive vehicles present practice normally involves the forming of a structural steel frame on which sheet metal body panels of the desired contour and shape are welded. The manufacture of vehicle bodies in this manner requires a great number of dies for stamping the metal frame members and the body panels and also requires a considerable amount of time and expense in assemblying the various components together. While there has been a trend in recent years to incorporate a greater amount of plastic in vehicle bodies, nevertheless the number of steel components employed results in substantial weight. Furthermore, considerable time and expense is involved in replacing or repairing a damaged body panel.

The primary object of the present invention is to provide a vehicle body construction which overcomes most of the problems involved in the manufacture and repair of vehicle bodies as presently constructed.

More specifically, it is an object of this invention to provide a vehicle body which is comprised essentially of a tubular steel frame on which a plurality of plastic panels are mounted to form substantially the entire exterior surface of the vehicle body.

Another object of this invention resides in the provision of a framework for a vehicle body which is composed substantially entirely of straight tubular members which are welded together to form a rigid frame for the body.

Another object of the invention is to provide a means for securing exterior plastic panels to a steel framework of the body in a simple manner which also facilitates replacement of a panel when necessary.

Figure 4:
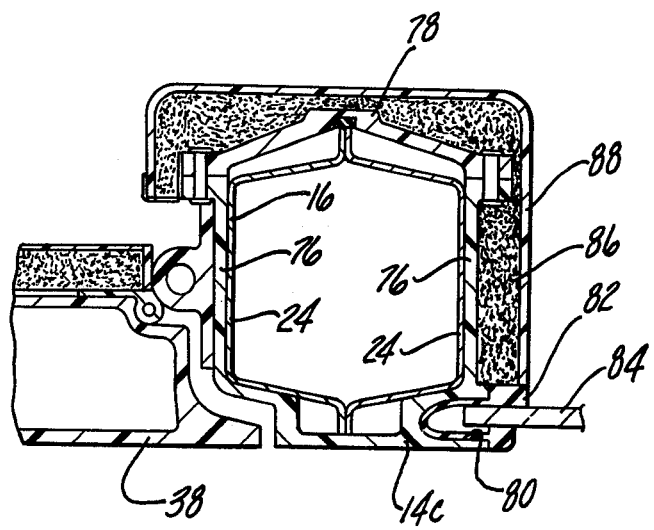

Other objects, features and advantages of the present invention will become apparent from the following description and accompanying drawings, in which:

FIG. 1 is a side elevational view, partly in section, showing a vehicle body constructed in accordance with the present invention, at least a portion of the body framework being shown in broken lines;

FIGS. 2, 3 and 4 are typical sectional views taken along the lines 2—2, 3—3 and 4—4, respectively, in FIG. 1 and showing the manner in which typical body panels are secured to the body framework;

FIG. 5 is a sectional view along the line 5—5 in FIG. 1 and illustrating the manner in which a pair of adjacent panels are secured together; and FIG. 6 is a fragmentary view, partly in section, showing the manner in which selected frame members are secured together.

The vehicle body 10 shown in FIG. 1 comprises a structural steel framework 12 on which is secured a plurality of body panels 14. The steel framework 12 consists of a plurality of straight tubular members 16 which are welded together in a desired configuration to form the rigid frame of the vehicle body. The structural body frame made up of the structural elements 16 is designed to resist stresses and fatigue and is also designed to support the engine, the wheels, the suspension, the drive line and the transmission.

Each tubular member 16 is formed of two half sections 18,20 of generally U-shape having side walls 22 which diverge slightly from a flat bottom wall 24. The free edges of the side walls 22 are formed with laterally outwardly extending flanges 26 which are spot welded together to form the straight tubular member 16. Each of the members 18,20 is designed to be cold rolled from light gauge, high-strength steel strip and then cut to the desired length of the particular structural element of the frame which it forms. The cross sectional dimensions of the elements 16 will vary in accordance with the load and stresses to which they are subjected. The opposite ends of the tubular members 16 are shaped in a suitable die to form the necessary configuration for joining the member with another tubular member. For example, as shown in FIG. 6, the two tubular members 16a, 16b have their ends notched for connection in angled relationship with tubular member 16c. The opposite ends of the tubular members 16 are provided with laterally outwardly extending flanges 28 which enable them to be spot welded to adjoining tubular members.

The panels 14 are preferably injection molded to the desired size and configuration so as to interfit with one another and thus provide the exterior surface of the vehicle body. The resin can be pigmented to produce the desired color and, if carefully molded, need not be thereafter painted. Therefore, the panels as molded can, in many instances, provide the exterior finish of the body. Each panel is preferably molded with reinforcing ribs 30 on the inner side thereof and is also molded with an inwardly extending flange 32 around the periphery thereof for connection with an adjacent panel. The flanges 32 can be riveted together in contacting relation or, if desired, where the joint between panels is covered by a trim strip such as shown at 34 in FIG. 5, the peripheral flange 32 may be spaced apart by a resilient rubber filler strip 36.

Each panel 14 which overlies a structural tubular member 16 is designed to be securely mounted on the tubular member. For example, as shown in FIG. 2, the body panel 14a located directly below the vehicle door 38 has molded on the inner face thereof a pair of spaced apart, parallel walls 40,42 which are adapted to straddle the opposite walls 24 of the adjacent tubular member 16. The free edges of walls 40,42 are molded with laterally outwardly extending flanges 44. An adaptor cap 46, which is also molded from plastic, straddles the side of the adjacent tubular member 16 which faces inwardly of the vehicle body and is likewise fashioned with flanges 48 along its laterally opposite edges. The adaptor cap 46 is preferably formed with a groove 50 in which a rubber cushioning strip 51 is mounted. Adaptor cap 46 is dimensioned such that when the flanges 48 along its opposite edges are seated on the flanges 44 on the walls 42, the tubular member 16 is completely enclosed and snugly embraced by the panel 14a, the inwardly projecting walls 40,42 and the adaptor cap 46. Flanges 44, 48 are provided with registering openings for receiving rivets 52. Rivets 52 are blind rivets of the self-plugging type which can be installed and crimped from the exposed side of adaptor cap 46 which is accessible from the interior side of the vehicle body. In the arrangement illustrated in FIG. 2 the lower rivets 52 are also utilized for securing a floor panel 56 to the body panel 14a. Suitable sealing strips 58,60 which may be of a conventional type may be adhesively secured to the door panel 38 and the body panel 14a to provide a sealed connection between these components when the door is closed. In the arrangement illustrated in FIG. 2 an exhaust conduit 62 from the vehicle engine extends through tubular member 16 and the space therebetween is filled with an insulating material 64.

It will be observed from FIG. 2 that, although the tubular members 16 are straight, the adjacent body panel need not be flat or straight. A tight fit between a contoured surface body panel and a straight tubular member can be obtained by simply forming ribs 66 projecting inwardly on the inner face of the body panel and dimensioned to contact the walls 22 of the adjacent tubular member 16. When such ribs are provided it is not essential that the adjacent flanges 26 on the adjacent tubular member 16 be in continuous contact with the inner surface of the body panel.

In the showing in FIG. 3 the tubular member 16 is the inclined forward door pillar of the body frame. In this case the body panel 14b surrounds a portion of the door pillar and is mounted thereon by means of the adaptor cap 68 which is secured to the flanged edges of panel 14b by rivets 70. A rubber molding strip 72 is adhesively secured to adaptor cap 68 for mounting the windshield 74.

In the sectional view illustrated in FIG. 4 the tubular member 16 forms the rear door pillar of the body frame. The body panel 14c is molded with inwardly projecting side walls 76,76 which snugly embrace the walls 24 of the tubular door pillar 16. The body panel is secured to the door pillar by means of the adaptor cap 78 in a manner similar to that illustrated in FIG. 2. The upper portion of panel 14c is molded with a groove 80 in which is seated a molding 82 for mounting the rear side window 84 on the vehicle body.

The interior lining of the vehicle is somewhat conventional. It comprises a sponge material 86 which is adhesively secured to portions of the body panels and the adaptor caps which face inwardly of the vehicle body for aesthetic, safety and sound reasons and a finished lining 88 which overlies and is adhesively secured, if desired, to the sponge material 86.

From the above description it will be apparent that the present invention provides a vehicle body having numerous advantages over steel bodies of conventional design. The problem of rusting and corrosion is avoided because the exterior surfaces of the body are plastic and also because the steel framework of the body is completely enclosed in plastic. The plastic panels and adaptor caps can be inexpensively molded on a production basis and can be assembled with the framework in a very expedient manner. In this connection it will be noted that the panels can be readily replaced by simply drilling out the rivets which connect a damaged panel to the frame and replacing it with a new panel. The frame itself is relatively inexpensive since all of the structural members thereof are straight and can be rolled inexpensively at a relatively high rate. Furthermore, it will be appreciated that, since the structural tubular members 16 of the body frame are tightly embraced by the channel-forming walls on the inner face of the panels and the adaptor caps, substantial rigidity is imparted to the body as a whole.

I claim:

1. A vehicle body of the type having a series of tubular structural members rigidly secured together to form a frame and a plurality of plastic panels overlying and secured to said structural members to provide the exterior of the body, each structural member comprising a pair of straight metal channel members each having a flat bottom wall and a pair of spaced side walls having laterally outwardly extending flanges along the longitudinal free edges thereof, each pair of channel members being arranged in opposed relation with their flanges juxtaposed and secured together to form the hollow structural member, said structural members being secured together in said frame with the secured flanges at one side of the structural member extending in a direction outwardly of the vehicle body and the opposite secured flanges extending in a direction inwardly of the vehicle body, the bottom walls of the channel members forming parallel side walls of the structural member which extend generally parallel to the secured flanges and in a direction transversely of the plane of the panels, each of said plastic panels having at least one pair of parallel spaced walls projecting from the inner face of the panel in a direction inwardly of the vehicle body, said pair of inwardly projecting walls and the portion of the panel extending therebetween straddling a portion of the structural member such that the inwardly projecting walls on the panel are in substantial co-planar engagement with the bottom walls of the structural member, said inwardly projecting walls having laterally outwardly extending flanges along their free edges spaced in a direction inwardly of the vehicle body from the inner face of the panel, the means for securing the panel to the structural member comprising an elongate adaptor cap straddling the side of the structural member facing inwardly of the vehicle body and having laterally outwardly extending flanges along opposed free edges thereof which are seated on and against the flanges at the edges of said inwardly projecting walls, the flanges of the adaptor cap and the flanges at the edges of said inwardly projecting walls having registering openings extending therethrough and blind rivets extending through said registering openings and securing the adaptor cap to the flanges of the inwardly projecting walls, said rivets being adapted to be inserted through said registering openings and crimped from the face of the adaptor cap which faces inwardly of the vehicle body, said adaptor cap engaging a portion of the structural member facing inwardly of the vehicle body and a portion of the panel between said inwardly projecting walls engaging a portion of the structural member facing outwardly of the vehicle body so as to rigidly secure the panel to the structural member.

2. The combination called for in claim 1 wherein said panels have a curved surface contour, the inner face of the portion of the panel between said inwardly projecting walls having ribs thereon projecting in a direction inwardly of the vehicle body, the ribs being dimensioned to abut portions of the adjacent structural member which face in a direction outwardly of the vehicle body.

3. The combination called for in claim 1 wherein the flanges of the structural member are secured together by spot welding.

4. The combination called for in claim 1 wherein the adjoining edge portions of the adjacent panels have flanges thereon which extend in a direction inwardly of the vehicle body, said last-mentioned flanges being secured together by fastening members extending therethrough.

5. The combination called for in claim 1 wherein the plastic panel, said adaptor caps and said inwardly projecting walls substantially completely enclose said structural members.

6. The combination called for in claim 1 wherein said adaptor caps are formed of plastic.

* * * * *